July 28, 1953  L. L. HOLIDAY ET AL  2,647,032
DETECTING DEVICE FOR FAST MOVING OBJECTS
Filed March 31, 1950  3 Sheets-Sheet 1
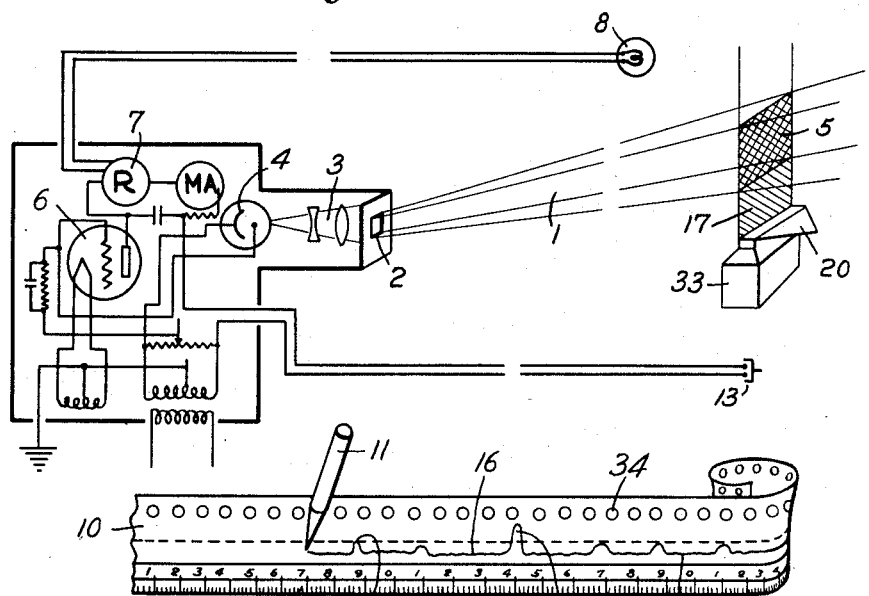
Fig. 1.
Fig. 2.
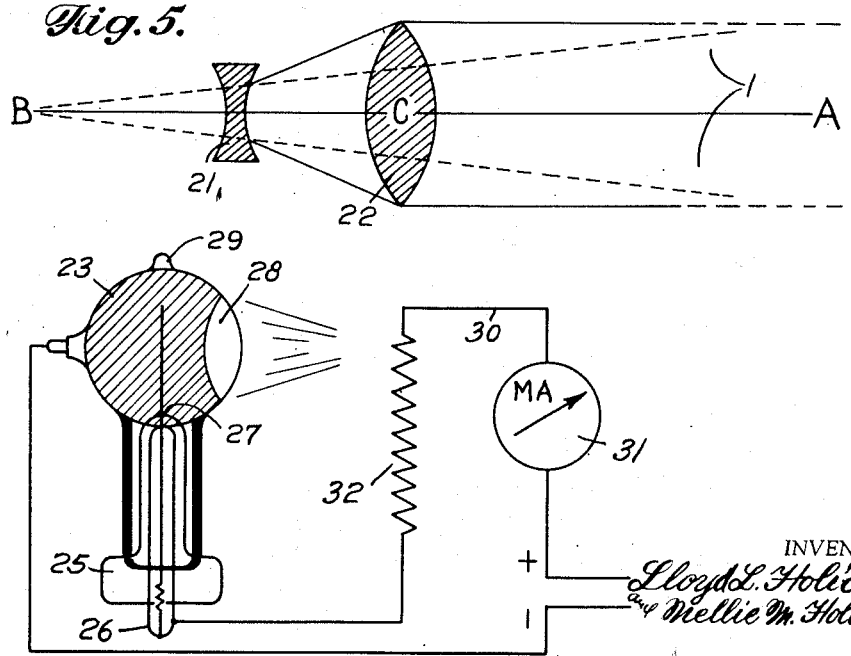
Fig. 5.
Fig. 6.
INVENTOR
Lloyd L. Holiday
and Nellie M. Holiday
BY Karl W. Flocks
ATTORNEY July 28, 1953 L. L. HOLIDAY ET AL 2,647,032
DETECTING DEVICE FOR FAST MOVING OBJECTS
Filed March 31, 1950 3 Sheets-Sheet 2

INVENTOR
Lloyd L. Holiday
Nellie M. Holiday

BY Karl W. Flocks
ATTORNEY

July 28, 1953  L. L. HOLIDAY ET AL  2,647,032
DETECTING DEVICE FOR FAST MOVING OBJECTS
Filed March 31, 1950  3 Sheets-Sheet 3

INVENTOR
Lloyd L. Holiday &
Nellie M. Holiday

BY Karl W. Flocks

ATTORNEY

Patented July 28, 1953

2,647,032

UNITED STATES PATENT OFFICE 2,647,032

DETECTING DEVICE FOR FAST-MOVING OBJECTS

Lloyd L. Holiday and Nellie M. Holiday, Cheyenne, Wyo.

Application March 31, 1950, Serial No. 153,021

3 Claims. (Cl. 346—33)

This invention relates to improvements in the method and apparatus for the detection and recording the passage of fast moving objects through a specific area, and more particularly to circumstances wherein a moving object is required to pass through an area enclosed within imaginary lines, and, wherein a record of permanent nature is desired, as, for example, in a baseball game, to positively indicate a "strike" or a "ball."

It is notoriously difficult for an umpire, in such games, to rely completely upon a fleeting visual moment, to detect a fast moving object, as a baseball intervening or passing through an area enclosed within imaginary lines, to give a decision free from possible dispute.

Therefore, it is an object of this invention to provide a method for the positive detection of the passage of a fast moving object of the character described, momentarily passing through a desired area enclosed within imaginary lines.

It is a further object of this invention to provide a method for the permanent recording of a moment of the character described.

Another object of the invention is to provide a combined apparatus for the detection, and the recording, of the passage of fast moving objects, said apparatus designed to present no obstruction to the field of play.

These and other objects and advantages will be apparent from the following description, taken in connection with the accompanying drawings wherein:

Fig. 1 diagrammatically represents an embodiment of this invention, one of the instruments being illustrated in sections, perspective for the detection and recording the passage of a fast moving object within the confines of an ill-defined or specified area enclosed within imaginary lines.

Fig. 2 represents a piece of a recording strip.

Fig. 5 is a representative lens system.

Fig. 6 is a representative photoelectric cell or photo-tube.

Figure 3:
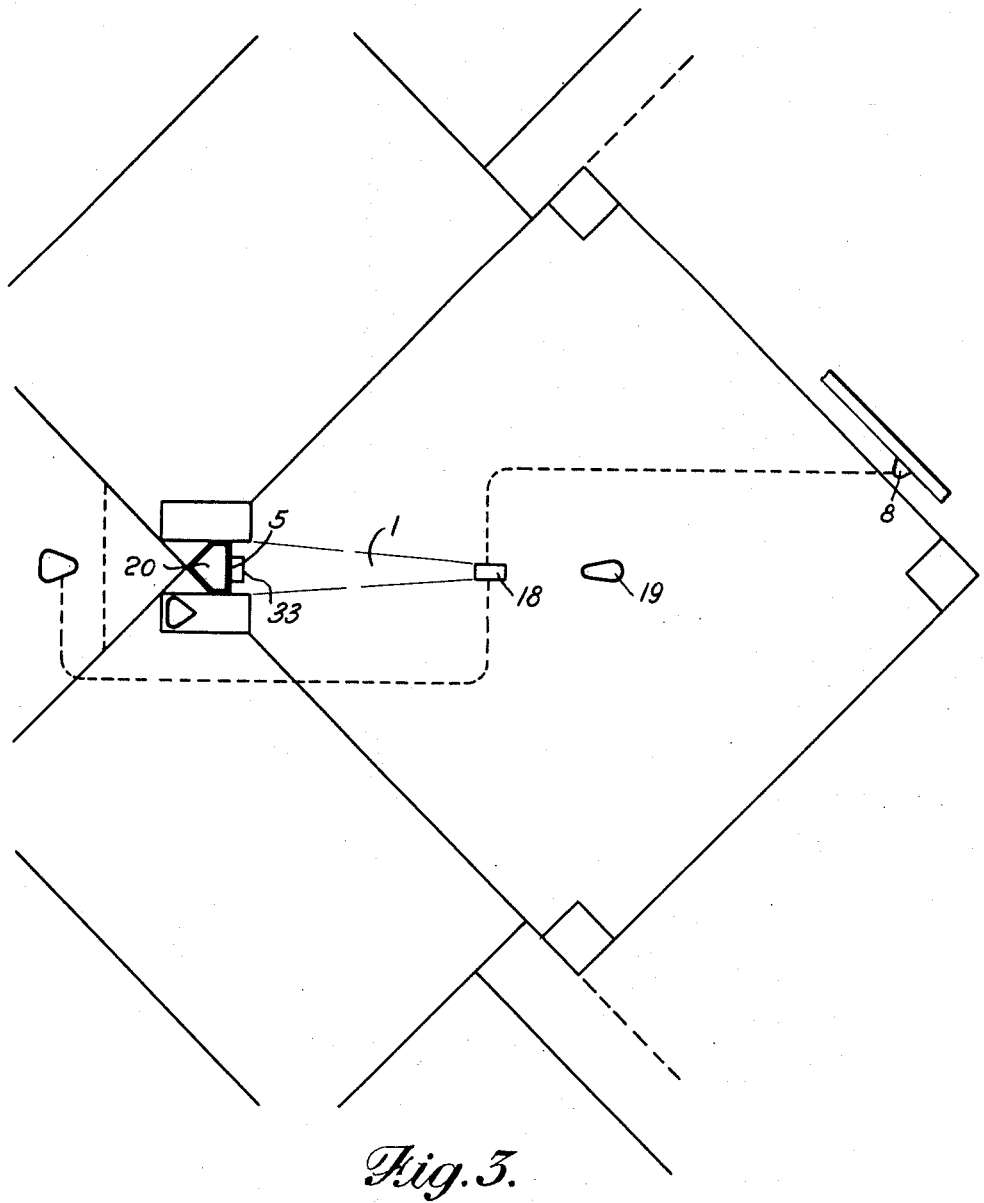
Fig. 3 illustrates diagrammatically an apparatus as described positioned in plan view for use in a baseball game.

The method and apparatus applied to a baseball game is described and illustrated throughout this specification, as an example only, and, as a preferred form of construction. We desire it to be understood that we do not limit our invention to such example quoted, or form illustrated, but that many uses are contemplated, and many changes and adaptations may be made therein without departing from the spirit of our invention as hereinafter claimed.

In order to more adequately demonstrate the need for a method and apparatus as described herein, for example, in a baseball game, the ball three inches in diameter can be pitched with remarkable speed towards the home plate, and, the ball must pass higher than the batter's knees, and lower than his shoulders, and within the width of the plate, for the umpire to call a "strike"; pitched balls which do not pass over the plate, or which do not pass at the right height, are termed "balls."

There is little to guide the umpire in determining whether the ball has passed within the 17 inch width of the home plate, and an imagined rectangle, the vertical sides of which extend from the batter's knees to shoulder height.

By the to be described method of detecting and recording the passage of a fast moving object within a desired area, no difficulty is involved in determining the moment of passage of the missile within such visually ill-defined area. Further, a record of the moment of passage within or outside such area can be made and retained for future reference.

Referring to the drawings in detail, in Fig. 1, light rays, designated 1, pass through a control aperture 2, of rectangular shape, and thence into a lens system 3, through which the light rays 1 are focussed and condensed, so that an image is projected upon the photo-emissive surface of a photo-electric cell 4, or a battery or bank of such cells, and preferably of the ultra light-sensitive cesium oxide type, or, the selenium cell.

The upper and lower sides of the rectangular aperture 2 are adjustable in a vertical direction to conform to the variation in knee to shoulder height of the batter at the plate 20, Figs. 1, 3, 4 and 7. The lens system 3 is aimed and focussed at the area through which a pitched ball must pass in order to be called a strike. This area is hereinafter called the "strike area" 5. Moreover, the lens system 3 is of fixed focus and is focussed upon the "strike area" 5. The effect of the aperture 2 and the lens system 3 is to throw a focussed image of the strike area upon the surface of the photo-electric cell 4, and to exclude all other light.

The photo-cell 4, Fig. 1, a simple form of which is illustrated in Fig. 6, comprises a spherical glass envelope 23, Fig. 6 with a long stem 24, mounted on a base 25, through which a pin 26 and a coaxial wire 27 of low photoemissivity, forming the anode, passes. The inside of the sphere, with the exception of a clear window 28, is silvered, and electrical connection to the silver film is made at the cap 29, the film forming the cathode of negative polarity. The silver layer during manufacture is oxidized by passing a glow discharge in an oxygen atmosphere, and cesium, or like alkali metal is deposited on the silver oxide, and is subsequently reduced to form cesium oxide. The cell is extremely sensitive to light rays passing through the clear window 26 and releases a flow of electrons through the cell; a positive voltage through the clear window 28 and releases a flow and a current as indicated by a micro-ammeter 31, will flow through the circuit. At the point 32 a load resistance, or a relay, may be inserted, or the voltage drop across a resistance, may be fed to the input of an amplifying device, as at 6, Fig. 1.

The light image from the strike area 5, Fig. 1 focussed upon the surface of the photo-electric cell 4 causes photo-electrons, emitted by the cathode 29, Fig. 6 to create an electro-motive force without any measurable delay in time and which is passed into an amplifying circuit 6 and the variations in current used to actuate a recording device 7, and, if required, a visual indicator 8, which may consist of a lamp or like device situated on the score board. The number of electrons emitted by the cathode 29 decrease with a decrease in the intensity of the light source from the strike area 5, Figs. 1, 3, 4 and 7 however momentary, or degree of reduction in intensity occurs the less the deflection of the micro-ammeter 31, Fig. 6. The frequency of the light source 1, i. e., or the color of the background or strike area 5 forming the wave length of the light, is important to the proper functioning of the cell. The velocity with which the electrons leave the cathode 29, Fig. 6 or the energy of the electrons at the moment of passing from the cathode, increases with the frequency of the light or background. The intensity of the light has no effect on the value of this initial energy of the electron, but, the frequency of the background must exceed a certain characteristic minimum value before any electrons are emitted; therefore, in the example of use described herein the batting area may require artificial illumination on dull days or for night games in order to provide a value able to actuate the photo-electric tubes efficiently.

The lens system 3, Fig. 5, consists of one or a series of lenses able to focus parallel light rays to a point, or vice-versa, a point source of light into parallel rays, as in a condenser lens system. The lens system may consist of a concave lens 21 placed behind a converging lens 22, the divergent effect of the lens 22 providing a virtual focal length equal to A. B., while the distance from the converging lens 22 to the photo-electric cell 4 has the small length C. B. By suitably adjusting the focal lengths and distance between the two lenses A. C. can be adjusted for considerable distances.

The complete apparatus, which may be confined in one receptacle, is adapted to work upon the principle that a fairly constant reading will be given through the light sensitive cells 4 by the surrounding illuminated area or field of light 5, and the sudden passing or passage of an object, as a baseball, through this field of light or strike area within focus, would cause an instantaneous variation, viz., an increase or decrease in the current generated by the light falling upon the cell 4 with a corresponding effect in the amplifying device 6 and the recording instrument 7.

This variation or effect may further be made visually apparent to the spectators as, by example, the illumination of a light bulb 8 positioned on the score board.

The recording instrument 7 will provide a permanent record, as by an ink line 9, Fig. 2, on a paper tape 10, adapted to pass or turn at a timed rate. The marking pen 11 is actuated by impulse from the amplifying device 6, Fig. 1. The paper tape 10 may be graduated in seconds, tenths or hundredths of seconds, or as desired, as indicated at 12, and may be run continuously during the course of the period desired, or run intermittently, or be actuated by an exterior source, as by an umpire operating an electrical contact 13, Fig. 1, at the release of the ball from the pitcher's box 19, Figs. 3 and 4.

The ink line 9, Fig. 2 will indicate a "strike" or the passage of an article of known size by a mark as at 14; the passage of other object larger than a ball would give a mark of increased height as at 15, and would, therefore, be identifiable in contrast to a "strike" mark, and vice-versa.

The identification of a "ball," that is, no passage through the focussed field of light or strike area, would leave no mark above or below the continuous line on the recording strip as at the time involved, as at 16, Fig. 2.

In the described method of use, viz, baseball, it is necessary to use two units of the character described. A pitched ball can record on a single apparatus as described and situated approximately midway and in direct line between the pitcher and the batter, but a pitched or high ball can record as a strike and still not pass through the strike area, but drop down in front of the plate.

Figure 4:
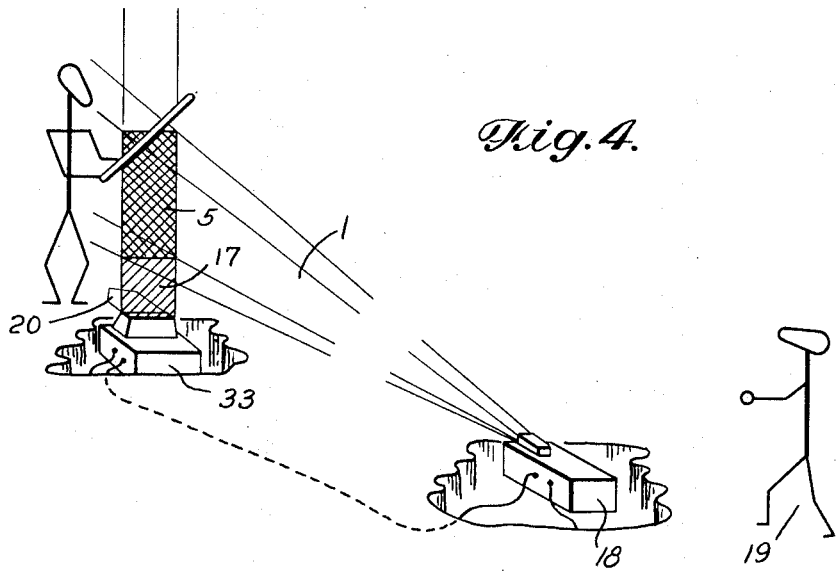
Fig. 4 is a diagrammatic perspective view of Fig. 3 with the ground cut-away to disclose the apparatus.
Figure 7:
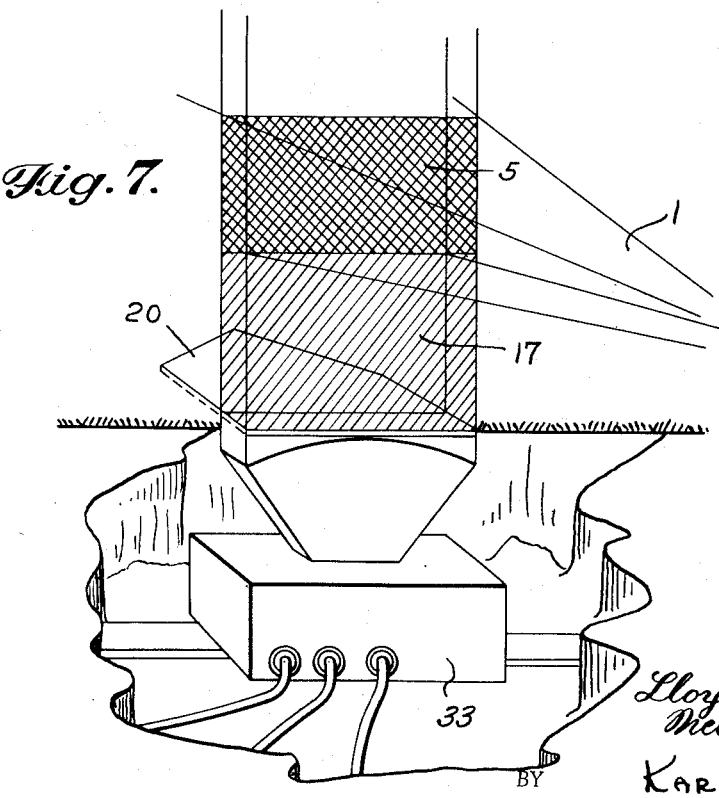
Fig. 7 is an illustration of the method of installing the apparatus at the home plate.

To be sure of a strike, the strike area is defined by two intersecting beams of light 1 and 17, Figs. 1, 4, and 7, and when the ball's passage is recorded by both devices simultaneously, then a strike is definite.

When using two devices or units as in a baseball game, the amplifying and recording devices may be synchronized to act in concert to give a single signal on one chart, and at the same time, one visual signal, and the units connected in a manner whereby one unit cannot function until the other also receives a signal.

When the apparatus is used as in the example described, the two complete mechanisms as illustrated in Fig. 1, each enclosed in suitable containers, would be located one at 18, Figs. 3 and 4 between the pitcher's box 19, Figs. 3 and 4, and the home plate 20. This container is preferably embedded below the surface of the ground at 18, Figs. 3 and 4, and at an angle whereby the focussed light ray 1 will provide a constant field of light, or area defined by light, at the required height and area 5, Figs. 1, 3, 4 and 7; this required area may be quickly adjusted to the batter's regulation vertical size by means of the aperture diaphragm 2, Fig. 1, the horizontal size being constant to the home plate width 20. The second device is located as at 33, Figs. 1, 3, 4, and 7, along the front edge of the home base or plate 20, and receives light projecting vertically downwards, and is similar in all respects to the first device with the exception that the aperture is fixed to conform with the width of the plate.

The electromotive force or difference of potential, the result of the current generated by the light sensitive cell 4, is directly proportional to the intensity and amount of light rays 1 reflected or falling upon the cell, and is detectable. The variation is measurable, and, when increased through an amplifying device 6 can be made to actuate a pen or like marking device 11, Fig. 2, in the recording apparatus 7.

The recording device 7, Fig. 1, may be a balanced null type potentiometer circuit and is not illustrated, the mechanism for which consists of a motor-driven cam-operated clamp, periodically clamping a galvanometer at fixed intervals; a second positioning device moves a slide wire contact by means of a gut string drive or by a gear or pawl drive, the recording pen being connected to a slide wire contact drive, moving an amount proportional to the slide wire movement.

An electrical circuit and apparatus suitable for the device and usage described consists of a photo-tube or a bank of tubes or photo-electric cells 4, Fig. 1, an amplifying device 6, and a recording device 7, together with the necessary means of calibrating and adjusting these three fundamental parts of the instrument. The photo-tube 4 receives light 1 through a condenser lens system 3, which in turn receives light through a controlled aperture 2 from an exterior source 5, the intensity of the light varying with the degree of light passing through the aperture 2, and the amplified current from the photo-tube will vary in the same way and can be measured and recorded.

In another form of the apparatus when the light impinging upon the photo-electric cell is cut or decreased by the passage of an intervening body through the specific area, and the cathode or control grid of a triode previously held by the constant light at a negative voltage rises immediately to approximately the same voltage as the filament. The triode thus becomes conducting and a current is sent through to the amplifier, assuming the system is in equilibrium at the constant intensity of the light from the specified area, any deviation from this intensity will produce the following response:

If the field of light is reduced as by the momentary passage of an object therethrough, a resultant reduction in the energy output of the photo-electric cell and the amplifier will occur. This change in energy will reduce the pressure on a balanced recording pen, previously drawing a straight line on a chart, and allowing an upward movement of the marking point, to a height dependent upon the reduction in light intensity caused by the fleeting passage of an object through the specified area.

The recording chart is preferably of the type driven by a toothed gear meshing with perforations 34, Fig. 2, on the side of the strip chart, the chart tension being controlled from a spool carrying a friction clutch to keep the chart taut, thus assuring a constant speed chart.

An accurate record of the passage of an object or objects through a constant and specified field or area, would have value not only in sports, but in industry, or be of value in military training, for example, in the training of mortar crews, artillery practice, or in the tracking of self-propelled missiles.

It will be apparent to those skilled in the art that variations and deviations from the foregoing method and in the apparatus, as described, may be indulged in without departing from the foregoing method and in the apparatus, as described, may be indulged in without departing from the spirit and scope of this invention, as defined in the appended claims.

What we claim as new and desire to secure by Letters Patent is:

1. Apparatus for the detection of and recording the passage of fast moving objects through a specific but ill-defined area, enclosed within imaginary lines, comprising in its essentials two photo-electric recording devices, each receiving a beam of light through individual lens systems, source of said light being the natural or artificial lighting of the vicinity, said beams intersecting to form the area through which the fast moving object is required to pass, one of said devices having an adjustable aperture to define said area, each photo-electric device actuating a separate amplifying and recording device, wherein said first device is positioned between the pitcher's box and the home plate of a baseball diamond so as to project the light defined area above the batter's knees and below the batter's shoulders and horizontally of the home plate width, wherein said second device is positioned below the front line of the home plate so as to project the light defined area vertically along the 17-inch width of the home plate, wherein said apparatus is externally controlled to provide intermittent readings at the desire of the umpire, by manipulating or actuating an electrical contact at a predetermined distance from said apparatus.

2. The structure recited in claim 1 and means for recording the passage of the fast moving objects through a specific area on a paper tape which is graduated in predetermined moments of time in synchronization with the number of times and time each variation occurs in a manner to correspond to the passage of the object through a constant field of light source.

3. Apparatus for the detecting and recording the passage of fast moving objects through a specific area, comprising two individual light sensitive devices responsive to natural or artificial lighting, each of said devices including a light source serving to pass light through a fixed focus lens system, a control diaphragm to provide an area of constant light, one of said devices having an adjustable aperture, a light sensitive cell operatively connected therewith, an amplifying device for amplifying the current variations from the cell, a tape recording mechanism connected thereto, the whole being enclosed in one container and connected to a signal lamp and an external actuating control means.

LLOYD L. HOLIDAY.
NELLIE M. HOLIDAY.

References Cited in the file of this patent

UNITED STATES PATENTS

| Number | Name | Date |
|---|---|---|
| 2,096,323 | Gille | Oct. 19, 1937 |
| 2,099,764 | Touceda | Nov. 23, 1937 |
| 2,113,899 | Oram | Apr. 12, 1938 |
| 2,133,132 | Clamann | Oct. 11, 1938 |
| 2,442,690 | Hoffman et al. | June 1, 1948 |
| 2,473,893 | Lyle | June 21, 1949 |
| 2,520,936 | Ingham, Jr. | Sept. 5, 1950 |
| 2,526,329 | Chamberlain | Oct. 17, 1950 |